Patented Mar. 27, 1934

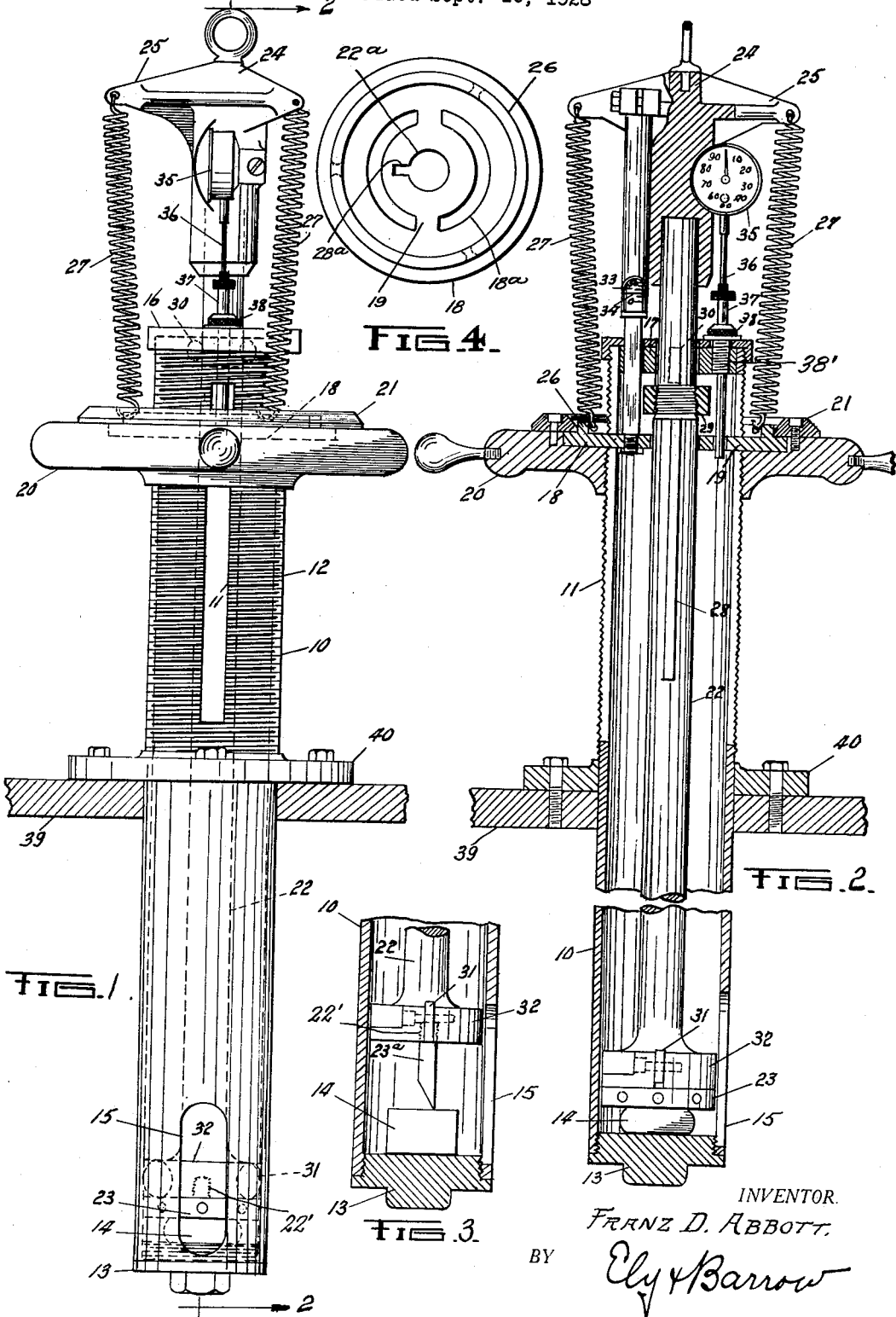

1,952,523

UNITED STATES PATENT OFFICE 1,952,523

COMPRESSION TESTING MACHINE

Franz D. Abbott, Akron, Ohio, assignor to The Firestone Tire & Rubber Company, Akron, Ohio, a corporation of Ohio Application September 10, 1928, Serial No. 304,911

1 Claim. (Cl. 265—18)

This invention relates to testing machines and particularly to apparatus for testing the effect of compression on resilient materials such as rubber and the like.

An object of the invention is to devise an apparatus for compressing a sample of rubber or like material to be tested, the compressive force being directly readable on the apparatus. Another object is to devise means for measuring the deflection in a test specimen of rubber or like material placed under compression. A further object is to devise a simple and effective machine for gauging the amount of permanent set produced in a specimen of resilient compressible material when the latter is placed under compression.

The foregoing and other objects are obtained by the devices illustrated in the accompanying drawing and described below. It is to be understood that the invention is not limited to the specific form thereof disclosed herein.

Of the accompanying drawing,

Figure 1 is a front elevation of a compression testing machine embodying the principles of the invention;

Figure 2 is a vertical section thereof taken on the line 2, 2 of Figure 1;

Figure 3 is a detailed section of a modified form thereof; and

Figure 4 is a plan detail of a member of the machine.

Referring to the drawing, the numeral 10 denotes a cylindrical shell formed with a pair of diametrically opposite slots 11 and provided on its upper half with external threads 12. The lower end of the shell is closed by means of a screw plug 13 affording an anvil or seating surface for the specimen 14 of resilient, compressible material to be tested, an aperture 15 being formed in the shell adjacent the lower end thereof for the introduction of the test specimen. The upper end of shell 10 is closed by means of a centrally apertured cap 16 having affixed thereto a plug member 17 adapted to be supported at the upper end of the shell. A plate member or spider 18, illustrated in Figure 4, is formed with a pair of arcuate slots 18ª adapting the spider to surround the shell with a central portion within the shell and an outer portion embracing the same, arms 19 connecting the inner and outer portions of the spider, passing through slots 11 and preventing relative rotation between plate 18 and shell 10. Handwheel 20 is internally threaded to engage threads 12 and is assembled with plate 18 in swivelled relationship by means of a collar 21 connecting the same; thus, as handwheel 20 is rotated plate 18 will be raised and lowered with respect to the shell. Extending centrally within the shell is a shaft 22 having threaded at its lower end at 22' a foot portion 23 for engagement with specimen 14 and having affixed to its upper end a crosshead 24 comprising a plurality of arms 25. An upstanding flange 26 on the outside portion of plate 18 is apertured for the attachment of a plurality of spiral tension springs 27 whose upper ends are hooked into the extremities of arms 25. The central shaft 22 passes through a central aperture 22ª in plate 18 and is prevented from relative rotation therewith by means of a feather key 28 slidable in keyway 28ª, downward motion of the shaft with respect to the plate being limited by means of collar 29 attached to the shaft.

Friction of the shaft with respect to the shell is reduced by means of upper and lower sets of rollers 30 and 31 respectively mounted in the upper plug member 17, and a lower collar 32 formed on the shaft. Shaft 22 is accordingly yieldingly connected to handwheel 20 and is adapted to be forced downwardly by the lowering of the handwheel, the degree of compression on the shaft being directly in proportion to the degree of distortion of the springs and being directly readable on a scale 33 affixed to plate 18, movable past an indicator 34 attached to crosshead 24 for measuring the degree of relative separation between plate 18 and crosshead 24. After shaft 22 has been brought into engagement with specimen 14, the deflection of the latter may be gauged by measuring the extent of relative movement between crosshead 24 and shell 10. A suitable micrometer 35 is accordingly attached to the crosshead and is adapted to have its plunger 36 engaged by a pin 37 adjustably secured to cap 16 on top of shell 10, a nut 38 being threaded to a collet 38' mounted in plug member 17 for securing the pin in any desired position. The apparatus is mounted on any suitable support 39 by means of flange collar 40 affixed to shell 10. Some tests are preferably carried out at temperatures in excess of normal room temperatures. In such a case 39 would be the top wall of a suitably heated oven (not shown) in order to maintain the lower end of apparatus containing the specimen at the desired elevated temperature. For a modified form of test, foot portion 23 may be removed and a standard sharp-edged cutting instrument 23ª threaded to shaft 22 at 22' as shown in Figure 3.

In the operation of the device to determine the amount of permanent set in a resilient compressible material, due to the fatigue or hysteresis loss resulting from compression, a specimen 14 of the material is placed upon plug 13 and end plate 23 on shaft 22 brought into engagement therewith by rotation of handwheel 20.

When plate 23 just barely touches the specimen, pin 37 is adjusted to engage plunger 36 of the micrometer to give a zero reading on the latter and is secured in this position by tightening nut 38. At this point the reading on scale 33 will also be at zero. Handwheel 20 is further rotated to cause the same to travel down the shell for yieldingly forcing down shaft 22 to compress the specimen between foot portion 23 and plug 13. The combined tension in springs 27 and the resultant force on shaft 22 is measured by the reading on scale 33, and when the desired compression has been obtained the reading on micrometer 35 is noted for gauging the original deflection of the specimen. The latter is then allowed to stand for any desired period of time, and the subsequent increase in micrometer reading 35 will give the additional deflection of the rubber due to its fatigue. When the specimen has been compressed for the desired period of time, handwheel 20 is rotated to release the compression until foot portion 23 again just barely touches the specimen, the micrometer reading at this point denoting the amount of deflection of the rubber due to set or hysteresis. The specimen is then permitted to stand without compression for an hour or so to recover as much as it will, and its deflection again gauged to determine the permanent set. The hysteresis curve may be plotted from readings taken periodically as the specimen is compressed and corresponding readings taken as the compression is released. It will be understood also that the tests may be conducted under temperatures below or above normal.

Instead of testing the specimen under constant load, it may be desired to test under constant distortion. In the latter test the specimen is initially compressed under a desired load and the deflection noted. The load is then gradually reduced as the rubber sets to maintain the deflection constant, the final gauging for temporary and permanent set being carried out as above. A further test that may be conducted by means of the apparatus is to determine the degree and speed of penetration effected by a sharp or blunt instrument forced into engagement with the specimen at various loads. For this test the sharp edged penetrating instrument is interposed between the specimen and the foot portion of shaft 22, pressure applied thereto by turning the handwheel, the pressure being indicated on scale 33 and being held constant for a short period of time at various loads. The amount of the resulting penetration during each period at each corresponding load is read on the micrometer, readings taken at the beginning and end of each period indicating the speed of penetration. This test is especially valuable in determining the resistance of tire tread rubber to penetration or cutting, simulating the effect of road cutting on a tire.

Modification of the construction disclosed herein may be resorted to without departing from the spirit of the invention or the scope thereof as defined by the appended claim.

What is claimed is:

Testing apparatus of the class described, comprising a cylindrical shell having a seat portion to receive a specimen of material to be tested, a shaft reciprocable in said shell and having a foot portion for engagement with the specimen, a reciprocable collar surrounding the shell, a handwheel swivelled to said collar and having threaded engagement with said shell for raising and lowering the collar, tension springs yieldably connecting said collar with the upper end of said shaft, a scale attached to said collar and an indicator attached to the upper end of said shaft for indicating compressive force applied to said shaft when the handwheel is turned to place the springs under tension, and a micrometer for gauging deflection of the test specimen by measuring relative movement between the shaft and the shell.

FRANZ D. ABBOTT.